(12) United States Patent
Drapeau et al.

(10) Patent No.: US 11,042,633 B2
(45) Date of Patent: Jun. 22, 2021

(54) METHODS FOR PROTECTING SOFTWARE HOOKS, AND RELATED COMPUTER SECURITY SYSTEMS AND APPARATUS

(71) Applicant: Carbon Black, Inc., Waltham, MA (US)

(72) Inventors: Paul M. Drapeau, Mendon, MA (US); Brian M. Sturk, Hudson, NH (US)

(73) Assignee: Carbon Black, Inc., Waltham, MA (US)

( * ) Notice: Subject to any disclaimer, the term of this patent is extended or adjusted under 35 U.S.C. 154(b) by 353 days.

(21) Appl. No.: 16/144,444

(22) Filed: Sep. 27, 2018

(65) Prior Publication Data

US 2019/0095616 A1 Mar. 28, 2019

Related U.S. Application Data

(60) Provisional application No. 62/564,012, filed on Sep. 27, 2017.

(51) Int. Cl.
| | |
|---|---|
| *G06F 11/00* | (2006.01) |
| *G06F 21/54* | (2013.01) |
| *G06F 21/55* | (2013.01) |
| *G06F 9/30* | (2018.01) |
| *G06F 9/54* | (2006.01) |
| *G06K 9/62* | (2006.01) |
| *G06F 11/30* | (2006.01) |
| *G06F 21/56* | (2013.01) |
| *G06F 9/455* | (2018.01) |

(52) U.S. Cl.
CPC .......... *G06F 21/54* (2013.01); *G06F 9/30101* (2013.01); *G06F 9/54* (2013.01); *G06F 11/3037* (2013.01); *G06F 21/552* (2013.01); *G06F 21/566* (2013.01); *G06K 9/6267* (2013.01); *G06F 9/455* (2013.01)

(58) Field of Classification Search
CPC .... G06F 11/3037; G06F 9/30101; G06F 9/54; G06F 9/455; G06F 21/552; G06F 21/54; G06F 21/566; G06K 9/6267
USPC .......................................................... 726/22
See application file for complete search history.

(56) References Cited

U.S. PATENT DOCUMENTS

| | | | | |
|---|---|---|---|---|
| 8,578,487 B2 * | 11/2013 | Soeder | ................ | G06F 21/6227 726/22 |
| 8,707,434 B2 * | 4/2014 | Dalcher | ................ | G06F 21/52 726/23 |
| 8,813,227 B2 * | 8/2014 | Sallam | ................ | H04L 63/145 726/24 |

(Continued)

*Primary Examiner* — Amare F Tabor

(57) ABSTRACT

A computing apparatus for protecting software hooks from interference may include a processing device and a memory access monitoring device configured to monitor access to the memory addresses of one or more hooks. When a task T1 attempts to write to a memory address of a monitored hook, the monitoring device may generate a notification (e.g., an interrupt), and the processing device may pause execution of the task T1 and initiate execution of a hook protection task T2. The hook protection task T2 may determine whether to allow task T1 to modify the monitored hook. If task T1 is not a trusted task (e.g., if task T1 is or may be malware), the processing device blocks T1 from modifying the monitored hook. In this manner, some attempts to unhook critical software hooks may be thwarted.

20 Claims, 4 Drawing Sheets

(56) References Cited

U.S. PATENT DOCUMENTS

| | | | | |
|---|---|---|---|---|
| 8,959,638 B2* | 2/2015 | Sallam | ............... | G06F 21/566 |
| | | | | 726/23 |
| 8,959,639 B2* | 2/2015 | Shevchenko | ......... | G06F 21/56 |
| | | | | 726/24 |
| 9,552,481 B1* | 1/2017 | Guo | ..................... | G06F 21/53 |
| 9,898,605 B2* | 2/2018 | Sahita | ............... | G06F 21/566 |
| 2014/0189449 A1* | 7/2014 | Jang | ..................... | G06F 21/54 |
| | | | | 714/718 |
| 2014/0351930 A1* | 11/2014 | Sun | ................. | H04L 63/1441 |
| | | | | 726/22 |
| 2015/0319183 A1* | 11/2015 | Liske | ................ | G06F 21/566 |
| | | | | 726/23 |
| 2016/0232347 A1* | 8/2016 | Badishi | ............... | G06F 21/54 |

\* cited by examiner

METHODS FOR PROTECTING SOFTWARE HOOKS, AND RELATED COMPUTER SECURITY SYSTEMS AND APPARATUS

CROSS-REFERENCE TO RELATED APPLICATION(S)

This application claims priority to and the benefit of U.S. Provisional Patent Application No. 62/564,012, titled "METHODS FOR PROTECTING SOFTWARE HOOKS, AND RELATED COMPUTER SECURITY SYSTEMS AND APPARATUS" and filed under on Sep. 27, 2017, which is hereby incorporated by reference herein in its entirety.

FIELD OF INVENTION

The present disclosure relates generally to computer security systems and techniques. Some embodiments described herein relate specifically to the protection of software hooks used by computer security systems.

BACKGROUND

As computer systems and networks (e.g., the Internet) are increasingly integrated into public activities (e.g., management and operation of governmental organizations) and private activities (e.g., personal activities, management and operation of households and businesses, etc.), malicious software ("malware") poses an increasingly significant threat to such pursuits. Malware generally attempts to disrupt operation of computer systems (e.g., by taking control of computational resources and using those resources for unauthorized purposes, by disabling individual computers or entire networks, by damaging or otherwise sabotaging system components, etc.) and/or to steal resources from computer systems (e.g., by gathering sensitive data). Malware can be deployed in many forms, including computer viruses, worms, trojan horses, ransomware, spyware, adware, scareware, keystroke loggers, rootkits, bots, crimeware, phishing scams, etc.

"Software hooking" (or simply "hooking") is a technique used in some computer security systems to monitor the execution of software. For example, hooking can be used to intercept operations (e.g., function calls) executed by processes or communications (e.g., messages, events, etc.) passed between processes. Hooking can be implemented using hooks (e.g., code) that intercept the operations or communications of interest.

For example, a computer security system may use hooks to monitor calls to an operating system's Application Programming Interface (API), thereby allowing the security system to detect access to API functionality and to enforce security policies related to such access. This monitoring can be performed, for example, by modifying code of loaded software modules in memory to implement hooks that subsequently alter program execution flow when particular API function calls are executed. The security system can inject such hooks into modules at load time or runtime, for example. In some systems, API calls may be implemented in libraries (e.g., dynamic link libraries or "DLLs"), and access to API functions may be monitored by injecting hooks into the API calls of such libraries. A hook can be injected, for example, by replacing instructions in the API call (e.g., the first few instructions in the API call) with a control flow modification instruction (e.g., a "jump" instruction) that redirects the execution flow to a handler (e.g., a function) that implements a portion of the security system's monitoring and/or enforcement functionality. The security system can then perform security functions (e.g., logging or investigating the API call, etc.) and return execution flow to the departure point in the API call after restoring or executing the call's original, replaced instructions.

Other implementations of API hooking are possible. Some implementations rely on modification of the API function call's original code in memory or on disk. In systems that use a shared library, rather than altering instructions of an API call to jump to an injected handler, the interrupt vector table or import descriptor table in the memory of a running process can be modified to point to the injected handler.

SUMMARY OF THE INVENTION

Computer security systems that use conventional hooking to implement monitoring and enforcement functions are generally susceptible to at least two vulnerabilities. First, the security system's monitoring and enforcement functionality is dependent on the preservation of the hooks, which generally use in-memory modifications to loaded code of monitored function calls to redirect control flow to handlers when calls to monitored functions are invoked. Second, when hooking is used, the security system's monitoring code runs in the same environment (e.g., in the security context with the same level of access to system resources) as the software (e.g., potentially hostile software) being monitored.

These vulnerabilities can be exploited, intentionally or unintentionally, to interfere with the operation of the security system. For example, malware can render the monitoring and enforcement functions of the security system inert by "unhooking" the handlers (e.g., by overwriting the hooks injected into the loaded code of the target functions with the original, unhooked instructions of the target function, which are generally stored on the computer system's disk). As another example, the presence of two or more security systems "competing" for hooks in the same code (e.g., function call) can present an interoperability or visibility problem. Well-behaved security systems hooking the same code generally create a chain of hooks each calling the next in sequence. However, the performance of a security system may depend on the placement of its hook in such a sequence (e.g., some security systems may perform best when their hooks are placed first or last in the chain of hooks), and even well-behaved security systems may interfere with the hooking order preferred by competing security systems. Thus, techniques are needed for preventing the unhooking of a security system's handlers, and for maintaining a security system's preferred place in a function call's hooking order.

Described herein are some embodiments of techniques for protecting software hooks from intentional or unintentional interference. In some embodiments, a computer includes a processing device and a memory access monitoring device (e.g., the debug registers of a processor) configured to monitor access to the memory addresses of one or more software hooks. When a task T1 attempts to write to a memory address of a monitored hook, the monitoring device may generate a notification (e.g., an interrupt), and the processing device may pause execution of the task T1 and initiate execution of a hook protection task T2. The hook protection task T2 may determine whether to allow task T1 to modify the monitored hook, based on security policies or other suitable criteria. If task T1 is not a trusted task (e.g., if task T1 is or may be malware), the processing device may block task T1 from modifying the monitored hook. In this manner, some attempts to unhook critical software hooks may be thwarted.

On the other hand, if task T1 is a trusted task or otherwise meets the criteria for modifying the monitored hook, the hook protection task T2 may permit task T1 to modify the monitored hook. Selectively permitting tasks to modify hooks can have a number of advantages, including the promotion of efficiency between computer systems authorized to interact with one another. For example, if a task is allowed to proceed once it is deemed to be trustworthy, then certain processes of the computer system do not need to be interrupted for very long to allow the task to modify the hook. Another advantage is an improvement to the security of the computer system, which may arise from permitting well-behaved, competing security tasks to co-exist without interfering with each other.

In general, one innovative aspect of the subject matter described in this specification can be embodied in an apparatus including a memory device configured to store processor-executable instructions; a memory access monitoring device; and a processing device configured to execute the processor-executable instructions. Executing the processor-executable instructions can cause the apparatus to perform operations including: identifying one or more software hooks to be protected; configuring the memory access monitoring device to (1) monitor access to memory addresses of the identified hooks and (2) generate a notification indicating detection of an attempt to modify a monitored hook in response to detecting an attempt by a first task to write to at least one of the memory addresses of at least one of the monitored hooks; configuring the processing device to execute a second task in response to the memory access monitoring device generating the notification indicating detection of the attempt to modify the monitored hook; and in response to the memory access monitoring device generating the notification, pausing execution of the first task and initiating execution of the second task, wherein the second task determines whether to allow the first task to modify the monitored hook.

Other embodiments of this aspect include corresponding methods, computer systems, and computer programs recorded on one or more computer storage devices, each configured to perform the aforementioned operations. A system of one or more computers can be configured to perform particular actions by virtue of having software, firmware, hardware, or a combination of them installed on the system that in operation causes or cause the system to perform the aforementioned operations. One or more computer programs can be configured to perform particular actions by virtue of including instructions that, when executed by data processing apparatus, cause the apparatus to perform the aforementioned operations.

In some embodiments, at least one of the identified hooks is inserted into an operating system (OS) application programming interface (API) function call. In some embodiments, the memory access monitoring device is integrated with the processing device. In some embodiments, the memory access monitoring device includes one or more debug registers of the processing device. In some embodiments, configuring the memory access monitoring device to monitor access to the identified hooks includes writing the memory addresses of the identified hooks to a subset of the debug registers. In some embodiments, configuring the processing device to execute the second task in response to the memory access monitoring device generating the notification includes identifying a memory address of a function corresponding to the second task as an interrupt handler for the notification. In some embodiments, the interrupt handler for the notification is identified with respect to an OS context corresponding to the first task.

In some embodiments, determining whether to allow the first task to modify the monitored hook includes: classifying the attempt to modify the monitored hook as benign or not benign; if the attempt to modify the monitored hook is classified as not benign, blocking the first task from modifying the monitored hook; and if the attempt to modify the monitored hook is classified as benign, permitting the first task to modify the monitored hook. In some embodiments, the hook is classified as benign, and the operations further include classifying the attempt to modify the monitored hook as authorized or unauthorized.

In some embodiments, the operations further include: if the attempt to modify the monitored hook is classified as unauthorized, scheduling maintenance on the monitored hook to be performed after the first task performs the attempt to modify the monitored hook. In some embodiments, the operations further include performing the scheduled maintenance on the monitored hook after the first task performs the attempt to modify the monitored hook, and performing the scheduled maintenance includes: identifying a software construct in which the monitored hook was injected prior to the first task's attempt to modify the monitored hook; determining whether the monitored hook is injected in the software construct; and if the monitored hook is not injected in the software construct, reinjecting the monitored hook into the software construct. In some embodiments, performing the scheduled maintenance further includes: determining whether a placement of the monitored hook in a chain of hooks satisfies one or more hook placement criteria; and if the placement of the monitored hook in the chain of hooks does not satisfy the hook placement criteria, removing the monitored hook from the chain of hooks and reinjecting the monitored hook into the chain of hooks at a new placement that satisfies the hook placement criteria.

Particular embodiments of the subject matter described in this specification can be implemented so as to realize one or more of the following advantages. Some embodiments may protect hooks (e.g., API hooks) in function calls of monitored applications even under conditions in which a potentially malicious process executes within the same security context (e.g., the same security privileges and/or boundaries) as the security software that monitors the system's operation and/or enforces the system's security policies. Some embodiments may prevent "unhooking" of a security system's handlers by preventing malware from undoing or overwriting the in-memory modifications of code responsible for implementing hooks. Some embodiments may increase the cost and complexity of attacking the hooks of a computer security system by transferring responsibility for monitoring one or more the hooks to trusted hardware (e.g., a processor of the computer system being monitored). Some embodiments may detect attacks (e.g., successful and/or unsuccessful attacks on the security software's hooks as those attacks occur), and may notify an administrator or monitoring system when an attack has been detected, thereby providing notification of a potential security breach and/or notification that the security software itself is untrustworthy as the breach occurs.

Some embodiments may be implemented using a software module that provides a subservice to a computer security system on a computer endpoint to improve (1) robustness of the security system's monitoring and enforcement functions (e.g., when faced with malware attacks) and (2) interoperability of the security system with other security systems. Some embodiments may allow a particular security system to defend the placement of its hook in the hooking order for a function call (e.g., an API function call) by detecting another system's attempts to hook the same function call, allowing the other system to inject its hook, and then reinjecting the particular system's hook at the desired location.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

Figure 1:
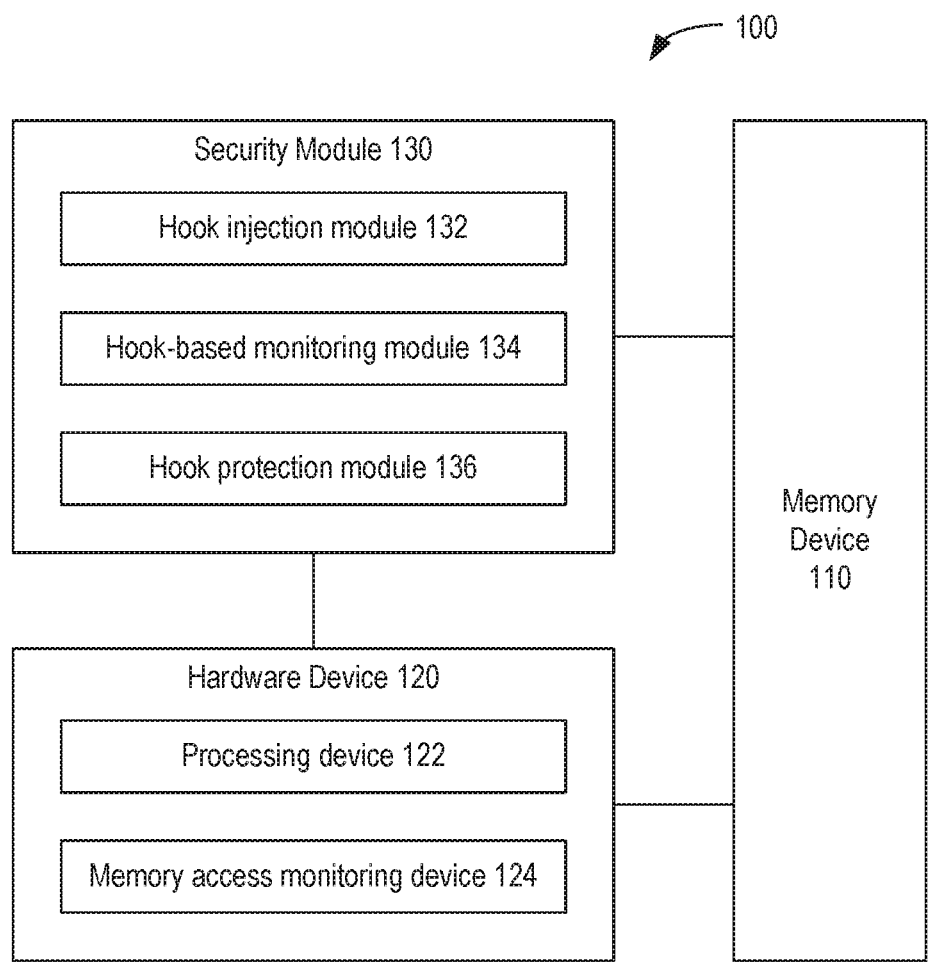
FIG. 1 is a block diagram of a computer equipped with a security module, according to some embodiments.

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Some Embodiments of Techniques for Robust Hooking

Referring to FIG. 1, a computer 100 may include at least one memory device 110, hardware device 120, and security module 130. Each memory device 110 can store instructions and/or data. For example, the memory device(s) 110 may store instructions and/or data of the security module 130. The hardware device(s) 120 may include a processing device 122, which may perform operations in accordance with instructions (e.g., instructions provided by a memory device 110). For example, the processing device 122 may execute the instructions of the security module 130.

The hardware device(s) 120 may include a memory access monitoring device 124, which monitors access to specified memory addresses in the memory device(s) 110. In some embodiments, the monitoring device 124 monitors access to the specified memory addresses by monitoring the address bus of the memory device 110 and comparing addresses detected on the address bus to the specified memory addresses. Other mechanisms for monitoring access to the specified memory address may be used. When a matching address is detected, the memory access monitoring device 124 may trigger a memory access notification (e.g., a hardware interrupt, a software interrupt, an exception, a trap, etc.), which may be processed by a specified handler. In some embodiments, the memory access notification may be any signal (e.g., a synchronous or asynchronous interrupt signal, exception, trap, etc.) provided to the processing device 122 that indicates the existence of an exceptional condition (e.g., an attempt to access a monitored memory address). The processing device 122 may be configured to respond to the memory access notification by initiating a context switch a hook protection handler, which may execute in kernel mode (e.g., a privileged execution mode, protection ring 0 of an x86 processing device, etc.) or in user mode (e.g., a non-privileged execution mode, protection ring 3 of an x86 processing device), depending on how the handler is configured.

In some embodiments, the memory access monitoring device is integrated with the processing device 122 (e.g., as a component of the processing device, on an integrated circuit with the processing device, on a card or board with the processing device, etc.). For example, the processing device 122 may include an Intel processor or Intel-compatible processor, and one or more registers (e.g., the debug registers) of the processing device 122 may be configured to implement a memory access monitoring device 124. In some embodiments, the memory access monitoring device 124 may be configured to detect attempts to access memory addresses of the code of injected hooks, and may trigger execution of hook protection handlers when an attempt to access an injected hook is detected.

The security component 130 may monitor activities of the computer 100 and enforce security policies using any suitable techniques including, without limitation, static malware detection techniques, behavior-based malware detection techniques, guided security incident detection techniques, guided incident response techniques, etc. In some embodiments, the security component 130 uses hooking to monitor access to certain functions (e.g., specified API functions including but not limited to operating system API functions, system calls, etc.) and to enforce security policies related to such access. The security component 130 may include a hook injection module 132, hook-based monitoring module 134, and hook protection module 136. In some embodiments, the hook injection module 132 creates hooks and injects the hooks into monitored software (e.g., monitored API function calls). The hook-based monitoring module 134 may monitor activities of hooked software (e.g., calls to hooked functions) and enforce security policies related to such activities. In some embodiments, the hook protection module 136 protects hooks against unauthorized unhooking and/or hook reordering.

The hook injection module 132 injects hooks in software to intercept specified operations and/or communications of software components. For example, the hook injection module 132 may inject hooks in specified function calls (e.g., API function calls) to intercept calls to specified functions (e.g., API functions). Some techniques for injecting a hook into a function call are described above.

When a hooked function call is executed, the hook redirects the execution flow from the invoked function to software associated with the hook-based monitoring module 134. For example, the hook-based monitoring module may include one or more handlers (e.g., handler functions), and each hook may redirect the execution flow to a handler corresponding to the function call in which the hook is injected. Each of the handlers may perform security monitoring and/or enforcement operations. For example, a handler may log the function call (e.g., by logging the date and time of the function call, the process that executed the function call, etc.), inspect the function call (e.g., by inspecting any data passed to the function call, attributes of the process executing the function call, etc.), and/or take action to enforce security policies related to the called function (e.g., interrupting the function call, terminating the task that initiated the function call, permitting the function call to execute, etc.). If the handler determines that the function call is not malicious, the handler may return execution flow to the departure point in the function call after restoring or executing the original instructions of the function call that were replaced by the injected hook.

Referring again to FIG. 1, the hook protection module 136 of the security module 130 may configure the computer 100 to detect and respond to attempts to modify hooks, thereby protecting the hooks against unauthorized unhooking and/or hook reordering. In some embodiments, the hook protection module 136 configures the memory access monitoring device 124 to detect attempts to access memory words in which one or more hooks are stored (e.g., attempts to access portions of memory device 110 at addresses where instructions that implement one or more hooks are stored). The hook protection module 136 may configure the memory access monitoring device 124 to detect any type of attempt to access (e.g., read or write) the memory words in which a hook is stored, or to detect only attempts to modify (e.g., write) the memory words in which a hook is stored. The hook protection module may configure the memory access monitoring device 124 to monitor the memory addresses of zero hooks, one hook, or more than one hook (e.g., all hooks, a set of specified hooks, etc.). In some embodiments, the hook protection module configures the processing device 122 to execute a specified handler when the monitoring device 124 generates a memory access notification indicating detection of an attempt to modify a monitored hook. In some embodiments, the hook protection module 136 uses the VirtualAlloc API call of the Microsoft Windows operating system to configure the operating system to track writes to specified, dynamically allocated portions of memory. An example of a method 200 for configuring the computer 100 to detect and respond to attempts to modify hooks is described below with reference to FIG. 2.

In some embodiments, the hook protection module 136 includes one or more hook protection handlers (e.g., handler functions). A hook protection handler function may implement a response to an attempt to modify a hook. Each hook protection handler function may be suitable for responding to attempts to modify one particular hook, a particular set of two or more hooks, or all hooks. For each of the monitored hooks, the hook protection module 136 may configure the processing device 122 to execute a corresponding hook protection handler function when the memory access monitoring device 124 detects software (e.g., any application, process, thread, task, etc.) attempting to access (e.g., modify) the monitored hook. An example of a method 300 for responding to an attempt to modify a hook (e.g., an example of a method implemented by a hook protection handler function) is described below with reference to FIG. 3.

Figure 2:
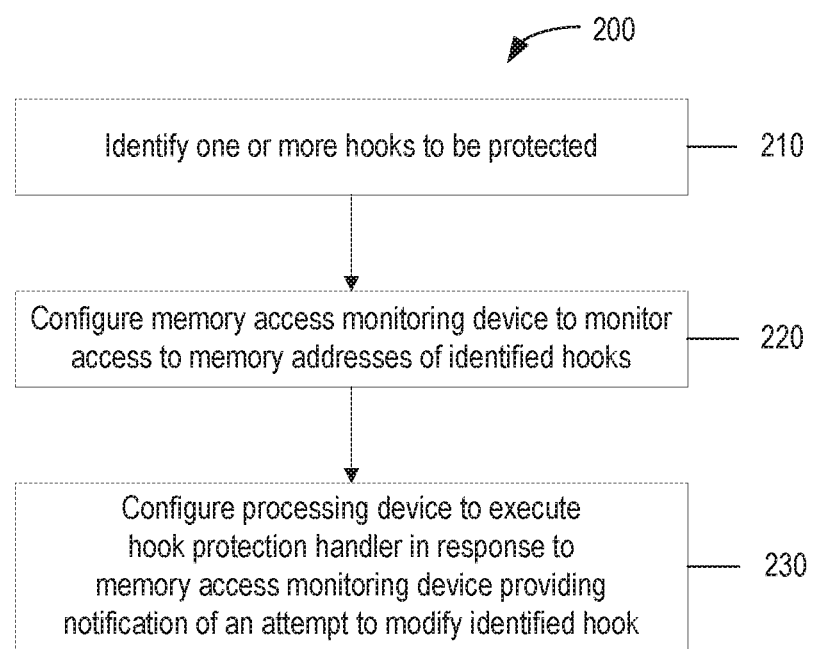
FIG. 2 is a flow chart of a method for configuring a computer to detect and respond to attempts to modify hooks, according to some embodiments.

Referring to FIG. 2, a method 200 for configuring a computer to detect and respond to attempts to modify hooks may include identifying (210) one or more hooks to be protected, configuring (220) a memory access monitoring device 124 of the computer to monitor access to memory addresses of the identified hooks, and configuring (230) a processing device 122 of the computer to execute a hook protection handler when the memory access device detects an attempt to modify an identified hook. The configuration method 200 may be performed by the hook protection module 136, for example. Some embodiments of the steps 210-230 of the method 200 are described in further detail below.

In step 210 of the configuration method 200, the hook protection module 136 may identify one or more hooks to be protected. In some embodiments, the hook protection module 136 identifies all the hooks injected by the hook injection module 132 as hooks to be protected. In some embodiments, the hook protection module 136 identifies particular groups or types of hooks as hooks to be protected. Some examples of groups or types of hooks to be protected may include, without limitation, hooks injected into function calls (e.g., calls to functions of the operating system's API, system calls, etc.) by the hook injection module 132, hooks injected into a set of specified function calls (e.g., calls to specified functions of the operating system's API, specified system call, etc.) by the hook injection module 132, a set of specified hooks (e.g., hooks identified by an operator or administrator of the security module 130), etc.

In some embodiments, the number of hooks to be protected may be limited by the resources of the memory access monitoring device 124, which may be capable of monitoring access to no more than a finite number of hooks in parallel. Furthermore, even in embodiments in which the memory access monitoring device 124 is capable of monitoring access to all the hooks in parallel, some hooks may be more critical than others to the overall operation of the security module 130 and the security of the computer 100. For example, hooks injected into API function calls that can be used to modify or remove existing hooks may be critical to the robust operation of the security module 130, whereas hooks injected into other API calls may be less critical. Thus, irrespective of the resources of the memory access monitoring device 124, monitoring access to only the most critical hooks (and responding to attempts to access such hooks) may be preferred, because monitoring and responding to attempts to modify the less critical hooks may cause unwarranted disruption to the operation of the computer 100.

Referring again to FIG. 2, in some embodiments of step 210, the hook protection module 136 identifies, as the hooks to be protected, one or more (e.g., all) hooks injected by the hook injection module 132 into a finite set of API function calls that can be used to modify or remove existing hooks. In some embodiments, the API function calls that can be used to modify or remove existing hooks, or the hooks injected into such API calls, are identified based on trusted input data (e.g., input data provided by a trusted operator or administrator of the security module 130). Such input data may expressly identify the API calls and/or hooks to be monitored, or may identify attributes of API calls to be monitored.

API calls that can be used to modify or remove existing hooks may include (1) API calls that can be used to change the memory access permissions on portions of memory where the hooks are stored (e.g., by changing the memory access permissions to permit write access to such memory), and/or (2) API calls that can be used to disable or reconfigure the hook protection module 136 or the memory access monitoring device 124 (e.g., by reconfiguring debug registers of the processing device 122, in some embodiments). Some examples of API calls that can be used to change memory access permissions include the VirtualProtect call (in Windows), the mprotect call (in OSX or Linux), and the vm_region/vm_region_64 calls (in OSX or Linux). Some examples of API calls that can be used to reconfigure the debug registers of a processing device 122 include the SetThreadContext call (in Windows), the perf_event_open call (in OSX or Linux), and the thread_set_state call (in OSX or Linux). Another example of an API call that may be used by some malware to attempt to modify or remove existing hooks is the Microsoft Windows API function OpenProcess( ).

In step 220 of the configuration method 200, the hook protection module 136 may configure a memory access monitoring device 124 of the computer to monitor access to memory addresses of the hooks identified in step 210 (e.g., memory addresses of the instructions that implement that identified hooks). In some embodiments, the memory access monitoring device 124 can be configured to monitor portions of memory (e.g., bytes or words) at N specified addresses (or in N specified address ranges) by providing the N addresses (or the boundaries of the N address ranges) to the monitoring device 124, wherein N is a finite number. In some embodiments, the memory access monitoring device 124 can be configured to monitor attempts to perform specified operations (e.g., read operations, write operations, read and write operations, etc.) on the memory words at the monitored addresses. For example, the memory access monitoring device 124 may include the debug registers of the processing device 122, which may be configured to monitor up to four memory addresses of interest by writing those memory addresses to the debug address registers (e.g., DR0-DR3), and may be configured to monitor attempts to perform specified operations on the bytes or words at those addresses by writing control data to the debug control register (e.g., DR7).

Figure 4:
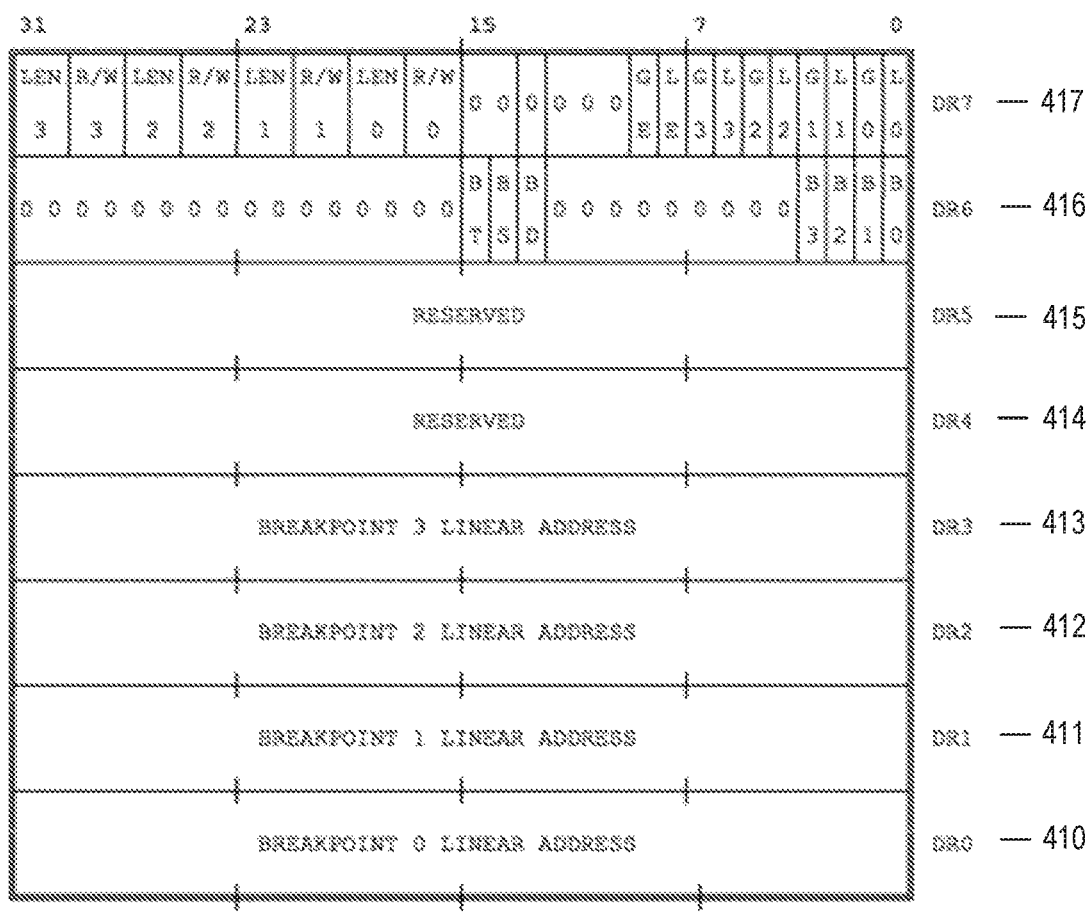
FIG. 4 is a block diagram of the debug registers of a processing device, according to some techniques.

Referring to FIG. 4, the debug register file 400 of a processing device (e.g., an Intel® processing device or an x86-compatible processing device) may include four debug address registers DR0-DR3 (410-413), a debug status register DR6 (416), a debug control register DR7 (417), and two reserved registers DR4-DR5 (414-415). The debug registers 410-413 and 417 may be used to set hardware breakpoints, which are often used during the software development process to suspend the software's execution at locations (e.g., instructions) specified by the developer. In some embodiments, the debug registers can be used to set hardware breakpoints that are triggered when a task attempts to write data to the address of a specified hook. In particular, the virtual addresses of up to four hooks may be stored in registers DR0-DR3, thereby creating hardware breakpoints at the addresses of those hooks. Bits 16-31 of register DR7 may be used to define the behavior of the hardware breakpoints, including the number of memory bytes to monitor at each breakpoint address (1, 2, 4, or 8 bytes) and the type of operation that triggers the breakpoint (instruction execution, data write, data read, or data read or write). Bits 0-7 of register DR7 may be used to specify whether the specified breakpoints are local to the executing task or global to all tasks. Bits 8-9 of register DR7 may be used to globally and/or locally enable the monitoring of the specified breakpoint conditions. When a breakpoint condition is triggered, bits 0-3 of register DR6 (a status register) may indicate which of the four breakpoints has been triggered. The handler process may read register DR6 to determine which of the monitored hooks has been accessed, and may clear register DR6 afterward.

When an attempt to access (e.g., to perform an operation of the specified type) a byte or word at a specified address is detected, the memory access monitoring device may trigger a memory access notification (e.g., an exception, an interrupt, etc.). The notification may be synchronous with the potentially malicious operation, in the sense that the memory access monitoring device may detect the offending access immediately and execution of the task that triggered the notification may be suspended either (1) before execution of the offending instruction is completed, or (2) after execution of the offending instruction is completed but before execution of any subsequent instruction of the offending task is completed.

In step 230 of the configuration method 200, the hook protection module 136 may configure the processing device 122 of the computer 100 to execute a hook protection handler in response to the processing device 122 detecting a memory access notification provided by the memory access monitoring device 124. In some embodiments, the memory access monitoring device 124 can issue different types of memory access notifications depending on the attributes of the attempted memory access that triggered the notification, security settings, etc. In such embodiments, the hook protection module 136 may configure the processing device to execute different hook protection handlers, depending on the type of memory access notification received, security settings, etc. In some embodiments, the memory access monitoring device 124 can issue a single type of memory access notification, and the hook protection module 136 may configure the processing device to execute the same hook protection handler for all memory access notifications.

When the processing device 122 initiates execution of the hook protection handler in response to a memory access notification, the processing device may provide data regarding attributes of the attempted memory access to the hook protection handler, and the hook protection handler may use those attributes to determine how to respond to the notification. Some examples of data regarding attributes of an attempted memory access may include, without limitation, the memory address for which an attempted access was detected, the type of memory access operation attempted, data identifying the process that attempted to access the monitored address, the register state of the processing device 122, the task context, etc.

Any suitable technique may be used to configure the processing device 122 to execute a specified hook protection handler in response to detecting a memory access notification. In some embodiments, the hook protection module 136 defines one or more hook protection handler functions, provides the address(es) of the handler function(s) to the processing device, and configures the processing device to execute the handler function(s) (e.g., by context switching to a process associated with the handler function and transferring control flow to the first instruction of the handler function) in response to receiving a corresponding memory access notification. The address of a handler function may be stored, for example, in a register of the processing device 122 (e.g., in a set of registers that stores addresses of interrupt handlers) or in a register of the memory access monitoring device 124 (e.g., in embodiments in which the monitoring device 124 is integrated with the processing device 122).

In some embodiments, the configuration parameters provided to the memory access monitoring device 124 and/or processing device 122 in steps 220 and 230 are global parameters that apply to all task contexts (e.g., process and/or thread contexts), and the processing device automatically applies these parameters to the context of a new task when the operating system performs a context switch. In some embodiments, the configuration parameters provided to the memory access monitoring device 124 and/or processing device 122 in steps 220 and 230 are local parameters that apply to the current task context (e.g., process or thread context), and the processing device does not automatically apply these parameters to the context of a new task when the operating system performs a context switch.

In some embodiments, the memory access monitoring device 124 is implemented using the debug registers of the processing device 122, the processing device 122 is configured to generate a fault if a task executing in a non-privileged execution context attempts to modify the value of a debug register, and the operating system provides one or more API calls (e.g., SetThreadContext, perf_event_open, thread_set_state, etc.) that can be used to modify the values of debug registers. In such embodiments, the hook protection module 136 and the memory access monitoring device 124 may be protected from disabling attacks by (1) injecting hooks into those API calls that can be used to modify the values of debug registers, (2) configuring the access monitoring device 124 to monitor attempts to access those hooks, and (3) configuring the hook protection module 136 to prevent other software from modifying or removing those hooks.

Figure 3:
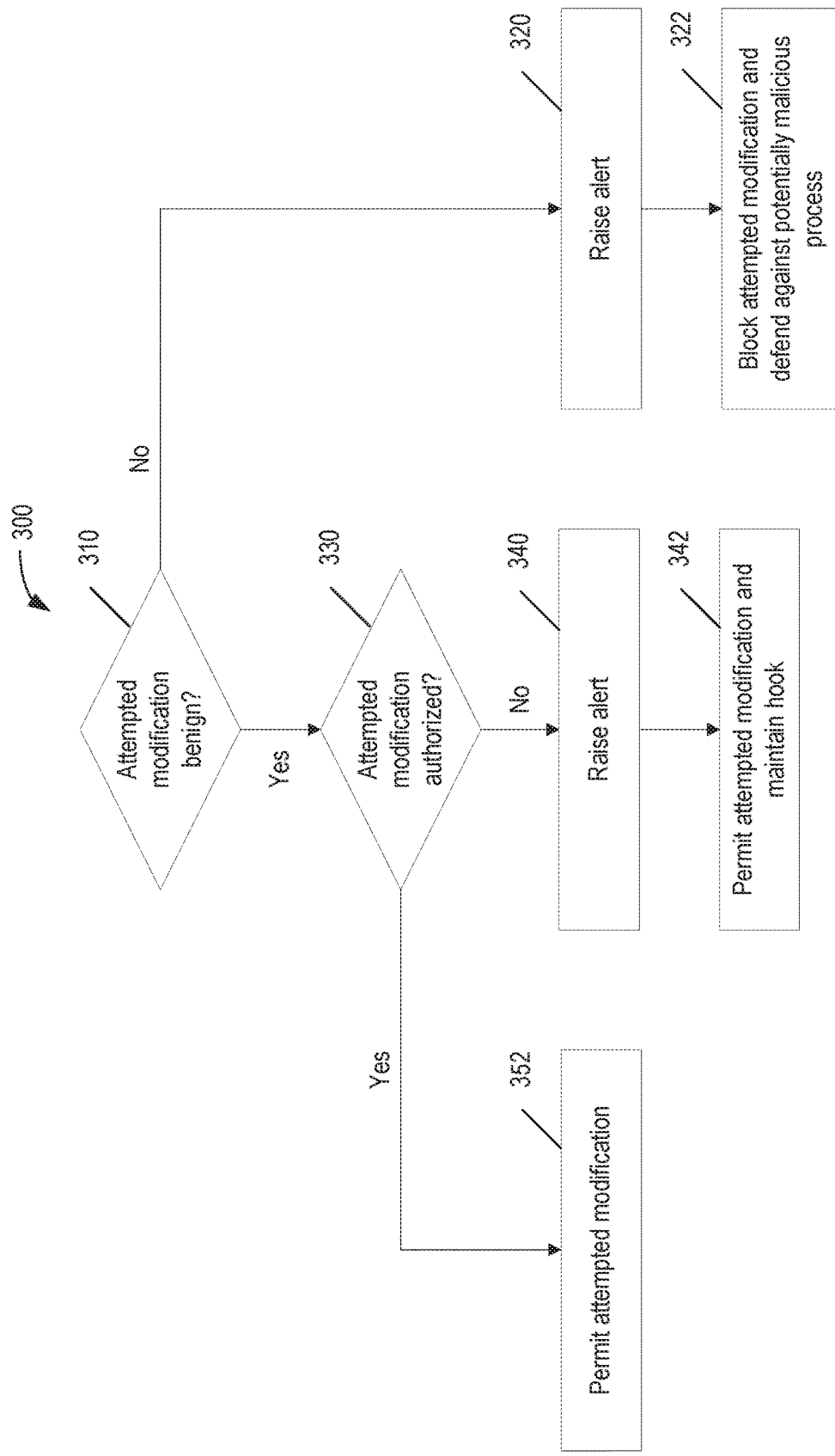
FIG. 3 is a flow chart of a method for responding to an attempt to modify a hook, according to some embodiments.

Referring to FIG. 3, an example of a method 300 for responding to an attempt to modify a hook is shown. The method 300 may be embodied, for example, in a hook protection handler function. In some embodiments, the response method 300 is initiated by the processing device 122 in response to the memory access monitoring device 124 generating a memory access notification indicating detection of an attempt to modify a monitored hook. In some embodiments, the processing device 122 pauses execution of the task (e.g., process or thread) attempting to modify the hook while the method 300 is performed (e.g., while the hook protection handler function executes).

The response method 300 may include one or more steps for classifying the attempt to modify a monitored hook (e.g., steps 310 and 330) and one or more class-dependent steps for responding to the attempted hook modification (e.g., steps 320-322, 340-342, and 352). In the example of FIG. 3, the attempted hook modification may be classified as (1) not benign (e.g., malicious, suspicious, unknown, etc.), (2) benign and authorized, or (3) benign and unauthorized. Other classifications may be used.

The attempted hook modification may be classified based on any suitable data including, without limitation, attributes of the hook in question (e.g., the identity of the API call in which the hook is inserted), attributes of the task attempting to modify the hook (e.g., whether the task corresponds to trusted software, to known malware, or to other software), etc. Attributes of the hook at a particular address may be determined using data provided by the security module 130 (e.g., by the hook injection module 132 and/or the hook-based monitoring module 134). Attributes of the task attempting to modify a hook may be determined by capturing the value of the processing device's instruction pointer when the memory access notification is detected, and using the security module 130 to identify the software module corresponding to that instruction pointer value.

In step 310, a determination is made as to whether the attempted hook modification is benign. In some embodiments, the attempted hook modification is classified as "benign" if a determination is made that the task attempting to modify the hook corresponds to trusted software (e.g., trusted security software, other whitelisted software, etc.). Otherwise, if the task attempting to modify the hook is not identified as trusted software (e.g., if a determination is made that the task attempting to modify the hook is malware, is blacklisted software, is greylisted software, is not whitelisted software, etc.), the attempted hook modification may be classified as "not benign."

In step 330, a determination is made as to whether an attempted hook modification is authorized. In some embodiments, the attempted hook modification is classified as "authorized" if a determination is made that the task attempting to modify the hook corresponds to the security module 130. For example, the attempted hook modification may be classified as authorized if the security system corresponding to the security module 130 is attempting to modify the hook. Otherwise (e.g., if trusted software other than the security module 130 is attempting to modify the hook), the attempted hook modification may be classified as "unauthorized."

In steps 320 and 322, a response to a non-benign hook modification attempt is carried out. In step 320, an alert is raised. For example, a message (e.g., an e-mail or other network-based electronic message) may be sent to an operator or administrator of the computer security system associated with the security module 130, a warning message may be provided (e.g., displayed) to a user of the computer 100, a record of the non-benign hook modification attempt may be logged, etc. The alert may, for example, indicate that a non-benign hook modification has been detected and provide data indicating (1) one or more attributes of the hook in question, (2) one or more attributes of the task attempting to modify the hook, and/or (3) other aspects of the state of the computer 100. In some embodiments, such alerts may warn the operator or administrator of the computer security system that the monitoring systems of the computer 100 are under threat or have been compromised.

In step 322, the non-benign hook modification attempt is blocked. For example, the task that initiated the attempted modification may be terminated, or that task may be permitted to continue executing but denied permission to modify the hook (e.g., denied write access to the portion of the memory device 110 in which the hook is stored). Furthermore, any other suitable action may be initiated to investigate and/or defend against the task that attempted to modify the hook (e.g., quarantining the task, removing any files corresponding to the task, etc.).

In steps 340 and 342, a response to a benign, unauthorized hook modification attempt is carried out. In step 340, an alert is raised. Some examples of alerts are described above with reference to step 320. As just one example, a record of the benign hook modification attempt may be logged. In step 342, the attempted modification of the hook is permitted (e.g., not blocked), and action is taken to maintain the hook injected by the hook injection module 132.

Any suitable action may be taken to maintain the hook including, but not limited to, scheduling the security module 130 to evaluate (and, if appropriate, reinject and/or reorder) the original hook after the hook modification is performed. For example, after the hook modification is performed, the security module 130 may scan the hooked code (e.g., parse instructions of the hooked API function call) to determine whether the original hook is still present in the hooked code (e.g., the original hook is in its original location and has not been modified in any way, or the original hook is in a chain of hooks at the location of the original hook and is otherwise unmodified) and if so, whether the original hook's current placement (e.g., rank) in any chain of hooks is acceptable. The acceptability of the hook's placement in a chain of hooks may be determined according to any suitable criteria. For example, the hook's placement may be suitable if the hook is placed first in the chain, last in the chain, or either first or last in the chain. If the original hook is no longer present in the hooked code, the hook injection module 132 may reinject the hook into the hooked code. If the original hook is present in the hooked code but has an unacceptable placement in a chain of hooks, the hook injection module 132 may change the hook's placement in the chain of hooks such that the hook's new placement satisfies the applicable criteria.

In step 352, a response to a benign, authorized hook modification attempt is carried out. For example, in step 352, the attempted modification of the hook may be permitted (e.g., not blocked).

Some embodiments have been described in which a memory access monitoring device 124 is used to monitor access to software hooks in API calls. In some embodiments, the techniques described herein may be used to monitor invocation of system calls (e.g., system calls that may be critical to the system's security, including but not limited to the KiSystemService system call and/or the KiSystemFast-Call system call), access (e.g., write access) to memory addresses where specified (e.g., critical) program data are stored, etc.

Some embodiments have been described in which the memory access monitoring device 124 is implemented using debug registers of a processing device 122. In such embodiments, the hook protection module 136 may perform the following operations to configure the debug registers and to monitor access to the memory addresses of one or more software hooks:

(Step 1) update the register context of all currently running threads, such that (i) debug registers DR0-DR3 are set with the virtual addresses of the hooks to be monitored (e.g., the virtual addresses of the inline patched API calls containing the hooks to be monitored), and (ii) debug register DR7 is updated with enable flag, conditions, and length;

(Step 2) intercept all newly spawned threads and update the register context of such threads as in Step (1);

(Step 3) register an exception handler globally for the exception code corresponding to the hardware breakpoints specified by the debug registers (e.g., the STATUS_SIN-GLE_STEP exception code); and (Step 4) when the exception handler is triggered, use the instruction pointer of the passed-in context to determine which task or module triggered the exception.

The hook protection module 136 may initiate performance of the above-described steps, for example, by injecting a DLL into a process. The DLL may then perform the steps or launch a separate process that performs the steps.

Malware executing in a non-privileged execution mode may attempt to disable or thwart the hook-protection and hook-monitoring techniques described herein by reconfiguring the memory access monitoring device 124 (e.g., the debug registers) so that the monitoring device does not generate a notification when the malware attempts to disable the hooks injected by the hook injection module 132. For example, such malware may use an API call or system call (e.g., the SetThreadContext API call in Windows) to locally or globally disable the debug registers, or to change the addresses stored in the debug registers. In some embodiments, the security module 130 may anticipate and defend against such attacks by configuring the monitoring device 124 to generate a notification upon execution (or attempted execution) of the API or system call that can be used to disable the monitoring device 124, and configuring the handler for that notification to prohibit the malware from disabling or reconfiguring the monitoring device.

Further Description of Some Embodiments

Some embodiments of the methods and operations described in the present disclosure can be implemented in digital electronic circuitry, or in computer software, firmware, or hardware, including the structures disclosed in this specification and their structural equivalents, or in combinations of one or more of them. In some embodiments, the security module 130, hook injection module 132, hook-based monitoring module 134, and/or hook protection module 136 can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some embodiments of the methods and operations described in the present disclosure can be implemented as operations performed by a data processing apparatus on data stored on one or more computer-readable storage devices or received from other sources.

The phrase "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

FIG. 1 shows a block diagram of a computer 100. The computer 100 includes one or more processing devices 122 for performing actions in accordance with instructions and one or more memory devices 110 for storing instructions and data. In some embodiments, the computer 100 implements a computer security system as described herein, or portions thereof. Different versions of computer security system may be stored, distributed, or installed. Some versions of the computer security system may implement only some embodiments of the methods described herein.

Generally, a computer 100 will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus comprising:
a memory device configured to store processor-executable instructions; a memory access monitoring device; and
a processing device configured to execute the processor-executable instructions, wherein executing the processor-executable instructions causes the apparatus to perform operations including:
identifying one or more software hooks to be protected;
configuring the memory access monitoring device to (1) monitor access to memory addresses of the identified hooks and (2) generate a notification indicating detection of an attempt to modify a monitored hook in response to detecting an attempt by a first task to write to at least one of the memory addresses of at least one of the monitored hooks, wherein configuring the memory access monitoring device comprises writing the memory addresses of the identified hooks to one or more debug registers;
configuring the processing device to execute a second task in response to the memory access monitoring device generating the notification indicating detection of the attempt to modify the monitored hook; and
in response to the memory access monitoring device generating the notification, pausing execution of the first task and initiating execution of the second task, wherein the second task determines whether to allow the first task to modify the monitored hook.

2. The apparatus of claim 1, wherein at least one of the identified hooks is inserted into an operating system (OS) application programming interface (API) function call.

3. The apparatus of claim 1, wherein the memory access monitoring device is integrated with the processing device.

4. The apparatus of claim 3, wherein configuring the processing device to execute the second task in response to the memory access monitoring device generating the notification comprises identifying a memory address of a function corresponding to the second task as an interrupt handler for the notification.

5. The apparatus of claim 4, wherein the interrupt handler for the notification is identified with respect to an OS context corresponding to the first task.

6. The apparatus of claim 1, wherein determining whether to allow the first task to modify the monitored hook comprises:
classifying the attempt to modify the monitored hook as benign or not benign, if the attempt to modify the monitored hook is classified as not benign;
blocking the first task from modifying the monitored hook; and
if the attempt to modify the monitored hook is classified as benign, permitting the first task to modify the monitored hook.

7. The apparatus of claim 6, wherein the hook is classified as benign, and wherein the operations further comprise classifying the attempt to modify the monitored hook as authorized or unauthorized.

8. The apparatus of claim 7, wherein the operations further comprise:
if the attempt to modify the monitored hook is classified as unauthorized, scheduling maintenance on the monitored hook to be performed after the first task performs the attempt to modify the monitored hook.

9. The apparatus of claim 8, wherein the operations further comprise performing a scheduled maintenance on the monitored hook after the first task performs the attempt to modify the monitored hook, and wherein performing the scheduled maintenance comprises:
identifying a software construct in which the monitored hook was injected prior to the first task's attempt to modify the monitored hook;
determining whether the monitored hook is injected in the software construct; and
if the monitored hook is not injected in the software construct, reinjecting the monitored hook into the software construct.

10. The apparatus of claim 9, wherein performing the scheduled maintenance further comprises:
determining whether a placement of the monitored hook in a chain of hooks satisfies one or more hook placement criteria; and
if the placement of the monitored hook in the chain of hooks does not satisfy the hook placement criteria, removing the monitored hook from the chain of hooks and reinjecting the monitored hook into the chain of hooks at a new placement that satisfies the hook placement criteria.

11. A method comprising:
identifying one or more software hooks to be protected;
configuring a memory access monitoring device to (1) monitor access to memory addresses of the identified hooks and (2) generate a notification indicating detection of an attempt to modify a monitored hook in response to detecting an attempt by a first task to write to at least one of the memory addresses of at least one of the monitored hooks, wherein configuring the memory access monitoring device comprises writing the memory addresses of the identified hooks to one or more debug registers;
configuring a processing device to execute a second task in response to the memory access monitoring device generating the notification indicating detection of the attempt to modify the monitored hook; and
in response to the memory access monitoring device generating the notification, pausing execution of the first task and initiating execution of the second task, wherein the second task determines whether to allow the first task to modify the monitored hook.

12. The method of claim 11, wherein at least one of the identified hooks is inserted into an operating system (OS) application programming interface (API) function call.

13. The method of claim 11, wherein the memory access monitoring device is integrated with the processing device.

14. The method of claim 13, wherein configuring the processing device to execute the second task in response to the memory access monitoring device generating the notification comprises identifying a memory address of a function corresponding to the second task as an interrupt handler for the notification.

15. The method of claim 14, wherein the interrupt handler for the notification is identified with respect to an OS context corresponding to the first task.

16. The method of claim 11, wherein determining whether to allow the first task to modify the monitored hook comprises:
classifying the attempt to modify the monitored hook as benign or not benign, if the attempt to modify the monitored hook is classified as not benign, blocking the first task from modifying the monitored hook; and
if the attempt to modify the monitored hook is classified as benign, permitting the first task to modify the monitored hook.

17. A method comprising:
identifying one or more software hooks to be protected;
configuring a memory access monitoring device to (1) monitor access to memory addresses of the identified hooks and (2) generate a notification indicating detection of an attempt to modify a monitored hook in response to detecting an attempt by a first task to write to at least one of the memory addresses of at least one of the monitored hooks;
configuring a processing device to execute a second task in response to the memory access monitoring device generating the notification indicating detection of the attempt to modify the monitored hook;
in response to the memory access monitoring device generating the notification, pausing execution of the first task and initiating execution of the second task, wherein the second task determines whether to allow the first task to modify the monitored hook;
classifying the attempt to modify the monitored hook as benign or not benign;
if the attempt to modify the monitored hook is classified as not benign, blocking the first task from modifying the monitored hook; and
if the attempt to modify the monitored hook is classified as benign: permitting the first task to modify the monitored hook and classifying the attempt to modify the monitored hook as authorized or unauthorized;

if the attempt to modify the monitored hook is classified as unauthorized, scheduling maintenance on the monitored hook to be performed after the first task performs the attempt to modify the monitored hook.

18. The method of claim 17, further comprising:

performing a scheduled maintenance on the monitored hook after the first task performs the attempt to modify the monitored hook.

19. The method of claim 18, wherein performing the scheduled maintenance comprise:

identifying a software construct in which the monitored hook was injected prior to the first task's attempt to modify the monitored hook.

20. The method of claim 19, wherein performing the scheduled maintenance further comprises:

determining whether the monitored hook is injected in the software construct; and if the monitored hook is not injected in the software construct, reinjecting the monitored hook into the software construct.

* * * * *